United States Patent [19]

Kirk et al.

[11] Patent Number: 5,972,176
[45] Date of Patent: Oct. 26, 1999

[54] CORONA TREATMENT OF POLYMERS

[75] Inventors: Seth M. Kirk, Minneapolis; Christopher S. Lyons; Richard L. Walter, both of St. Paul, all of Minn.

[73] Assignee: 3M Innovative Properties Company, St. Paul, Minn.

[21] Appl. No.: 08/943,487

[22] Filed: Oct. 3, 1997

[51] Int. Cl.⁶ .................................................. B01J 19/08
[52] U.S. Cl. ........................... 204/164; 427/536; 427/535
[58] Field of Search .................................... 204/164, 165; 427/536, 535

[56] References Cited

U.S. PATENT DOCUMENTS

| | | | |
|---|---|---|---|
| 3,030,290 | 4/1962 | Ryan | 204/169 |
| 3,255,099 | 6/1966 | Wolinski | 204/169 |
| 3,274,089 | 9/1966 | Wolinski | 204/165 |
| 3,275,540 | 9/1966 | McBride | 204/165 |
| 3,291,712 | 12/1966 | McBride | 204/165 |
| 3,296,011 | 1/1967 | McBride et al. | 117/47 |
| 3,639,134 | 2/1972 | Stegmeir et al. | 117/7 |
| 3,761,299 | 9/1973 | Lidel | 117/34 |
| 4,451,497 | 5/1984 | Dolezalek et al. | 427/39 |
| 4,549,921 | 10/1985 | Wolfe, Jr. | 156/272.6 |
| 4,563,316 | 1/1986 | Isaka et al. | 264/22 |
| 4,735,996 | 4/1988 | Nagai et al. | 525/326.4 |
| 5,126,164 | 6/1992 | Okazaki et al. | 427/39 |
| 5,320,888 | 6/1994 | Stevens | 428/36.2 |
| 5,425,832 | 6/1995 | Kusano et al. | 156/272.6 |
| 5,597,456 | 1/1997 | Maruyama et al. | 204/165 |

FOREIGN PATENT DOCUMENTS

| | | |
|---|---|---|
| 0 308 811 | 3/1989 | European Pat. Off. |
| 0 551 094 | 7/1993 | European Pat. Off. |
| 0 603 784 | 6/1994 | European Pat. Off. |
| 157659 | 12/1982 | Germany . |
| 43-21993 | 12/1966 | Japan . |
| 57-34137 | 2/1982 | Japan . |
| 59-67015 | 4/1984 | Japan . |
| 6263949 | 9/1997 | Japan . |
| WO 97/13266 | 4/1997 | WIPO . |

OTHER PUBLICATIONS

P.Y. Tsai et al., "Surface Modifications of Nonwoven Webs Using One Atmosphere Glow Discharge Plasma to Improve Web Wettability and Other Textile Popperties", Paper Presented at Fourth Annual TANDEC Nonwovens Conference, Knoxville, TN, Nov. 14–Nov. 16, 1994, 36 pages.

S. Kanazawa et al., "Glow Plasma Treatment at Atmospheric Pressure for Surface Modification and Film Deposition", *Nuclear Instruments and Methods in Physics Research*, 1989, pp. 842–845.

S. Kanazawa et al., "Stable glow plasma at atmospheric pressure", *J. Phys. D: Appl. Phys.*, 21, 1988, pp. 838–840.

A.R. Blythe et al., "Surface modification of polyethylene by electrical discharge treatment and the mechanism of autoadhesion", *Polymer*, 19, 1273–1278, 1978.

Chemical Abstract 114718, vol. 102, No. 14, Nippon Oil Seal Industry Co., "Surface Treatment of Fluoropolymer Moldings", Apr. 8, 1985.

Chemical Abstract 248646, vol. 114, No. 26, IDA, K., "High–strength Fluoropolymer Compositions for Sideing parts", Jul. 1, 1991.

*Primary Examiner*—Kishor Mayekar
*Attorney, Agent, or Firm*—Douglas B. Little

[57] ABSTRACT

A process for corona treating a polymer is described. The process involves exposing at least one surface of an article comprising a polymeric material selected from the group consisting of fluoropolymers, polycarbonates, and polyimides to a corona discharge in an atmosphere containing nitrogen and about 0.01 to about 10 percent of an additional gas selected from the group consisting of hydrogen, ammonia and mixtures thereof.

15 Claims, 1 Drawing Sheet

CORONA TREATMENT OF POLYMERS

TECHNICAL FIELD

This invention relates to methods of treating polymers with a corona discharge in atmospheres containing nitrogen and hydrogen or ammonia or mixtures thereof.

BACKGROUND ART

Corona treatment of polymer film surfaces is well known. "Corona," as used herein, refers to electrical discharges that occur at substantially atmospheric pressure, and is to be distinguished from sub-atmospheric and vacuum-pressure electrical discharges or processes, as well as from subatmospheric and atmospheric "glow" discharges as described in European Patent Publication No. 603784.

One purpose of corona treatment, or "corona-priming," of a polymer surface is to improve the interaction of the polymer surface with adhesives. Another purpose of corona treatment is to improve wettability of the surface. Corona priming of polymer films in air to increase interaction with adhesives and wettability of the surface is a well-known commercial process. Air corona priming is typically performed in the presence of ambient atmospheric gases (i.e., nitrogen and oxygen and trace gases) at atmospheric pressure. Corona processes are generally faster, cheaper, and more susceptible of application to in-line industrial processes than are sub-atmospheric and vacuum-pressure processes.

DISCLOSURE OF INVENTION

The invention features a process for treating a polymeric surface of an article by exposing at least one polymeric surface containing a polymeric material selected from the group consisting of fluoropolymers, polycarbonates, and polyimides to a corona discharge in an atmosphere containing nitrogen and about 0.01 to about 10 volume percent of an additive gas selected from the group consisting of hydrogen, ammonia, and mixtures thereof.

In preferred embodiments of the invention, the polymeric material is in the form of a polymer film. The invention is particularly useful in the treatment of fluoropolymer film surfaces. A preferred fluoropolymer film for use in the invention is a film containing polytetrafluoroethylene. In other embodiments, the polymer film may be a polycarbonate film or a polyimide film.

The atmosphere in which the process is carried out may preferably contain nitrogen and about 0.1 to about 1.0 percent hydrogen, ammonia, or mixtures thereof.

In preferred embodiments of the invention, the corona discharge is characterized by a normalized energy of between about 0.1 and about 100, and more preferably between about 1 and 20, joules per square centimeter.

The process of the invention may further include the step of coating the corona treated surface with an adhesive.

The term "corona," as used herein, refers to electrical discharges that occur at substantially atmospheric pressure, and is to be distinguished from electrical discharges that occur under a vacuum, characterized by an intense, diffuse glow in the space between the anode and cathode, sometimes called "glow" discharge.

As described herein, the present invention has several advantages. The corona treatment process of the present invention provides an effective and efficient surface treatment of polymer films that produces significant and advantageous modification to polymer surfaces; it is less expensive and time consuming than sub-atmospheric processes that require complex vacuum producing apparatus. Because of its low cost and efficiency, it is readily susceptible to application in an in-line industrial process, which is particularly important in the processing of polymer films that are supplied in roll form. Moreover, the low cost of nitrogen as a major atmosphere component makes the process of the present invention attractive for application as a large-scale industrial process. Fluoropolymer films, which are attractive materials for use in many tape and surface-covering applications because of their relatively high thermal and chemical stability, are particularly suited for use in this invention; hydrogen and/or ammonia additions to a nitrogen corona atmosphere produce a significant and advantageous effect on fluoropolymer surfaces.

The inventive process is preferred over wet chemical priming methods. It does not involve any of their attendant environmental issues and does not cause discoloration of polymer to the same extent as wet chemical priming.

Other advantages of the invention will be apparent from the following description, from the FIGURE, and from the appended claims.

DETAILED DESCRIPTION

Figure 1:
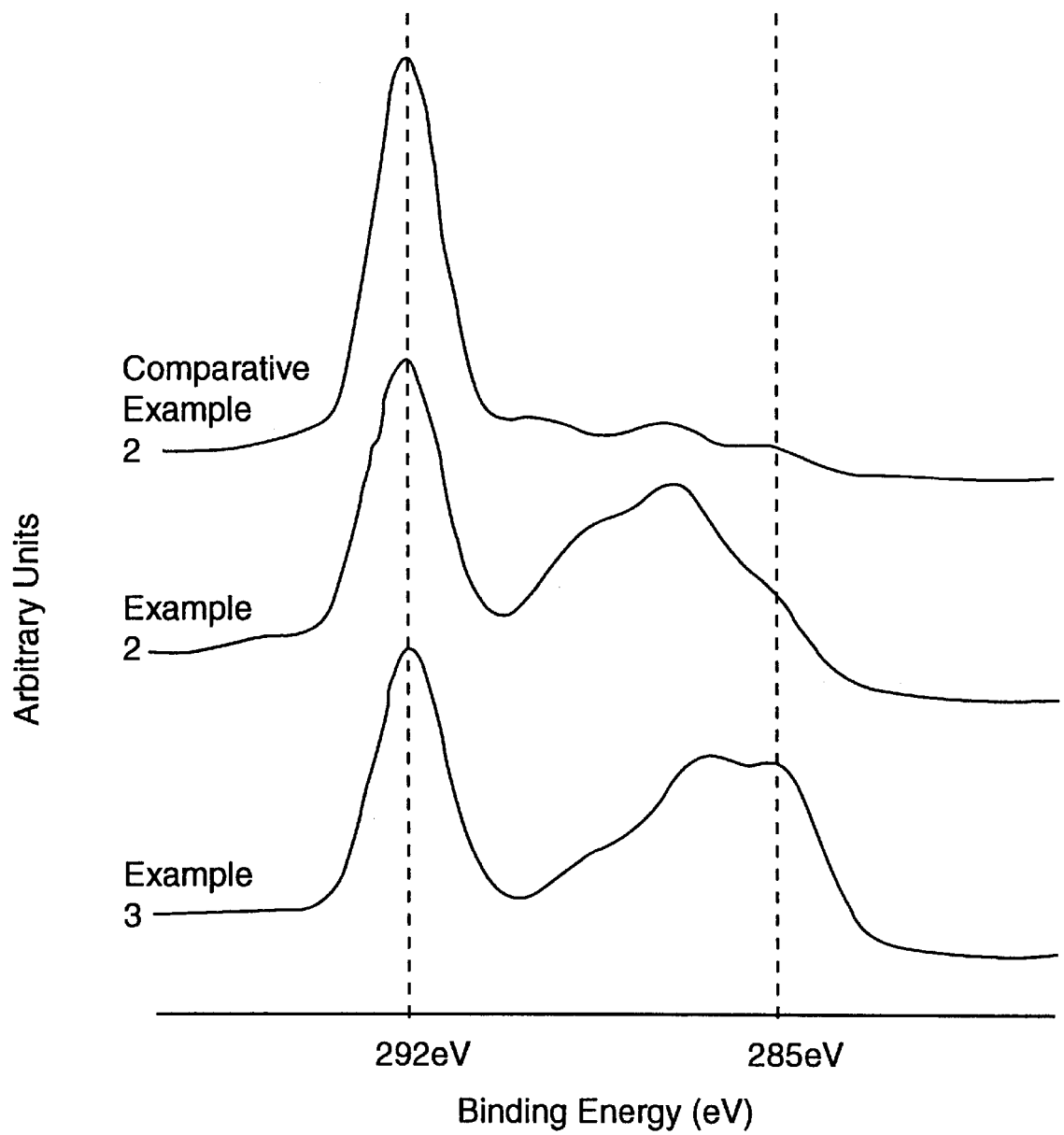
FIG. 1 depicts x-ray photoelectron spectroscopy (ESCA) carbon 1s (C1s) spectra of polytetrafluoroethylene treated with nitrogen and nitrogen/hydrogen corona discharges.

The invention relates to a process for corona treating a polymer surface in a nitrogen/hydrogen or nitrogen/ammonia atmosphere. The present inventors have discovered, unexpectedly, that with respect to certain polymers, the addition of hydrogen or ammonia to a nitrogen corona atmosphere results in significant increases in polymer surface reception to adhesives and in surface wettability, and that corona treatments in such atmospheres produce changes in water contact angles and in surface composition indicative of favorable surface properties. Among other uses, the invention finds useful application in the preparation of surfaces in which polymer surface modification, or "priming" is utilized to increase the interaction of a polymer surface with a coating or to improve wettability of a polymer surface with respect to the coating. Examples of coatings for which the process of the present invention is useful include adhesives (hot-melt or solvent-based), pigments, colorants, hard-coats, anti-static coatings, weather resistant coatings, metallized coatings, laminates, and the like.

Accordingly, the invention features a process for treating a polymeric surface of an article that includes the step of exposing at least one polymeric surface containing a polymeric material selected from the group consisting of fluoropolymers, polycarbonates, and polyimides to a corona discharge in an atmosphere containing nitrogen and from about 0.01 to about 10 percent of an additional gas selected from the group consisting of hydrogen, ammonia, and mixtures thereof.

The process is effective for modifying, or priming, a fluoropolymer, polycarbonate, or polyimide surface to improve adhesion and wettability properties of the surface. Typically, the article to be treated in the process will be in the form of a thin polymer film, and may be in the form of a roll of film that may be fed into a corona treatment apparatus. The article to be treated may, however, be in any form, configuration, or thickness, provided it contains a polymeric surface that can be corona treated as described herein. For example, the article may be in the form of a laminate in which a polymeric film is laminated to a substrate material.

Any polymer that is a member of the fluoropolymer, polycarbonate, or polyimide classes of polymers may be used in the process; the fluoropolymers are particularly preferred because of their relative chemical and thermal stability. Numerous fluoropolymers and copolymers of fluoromonomers are known and commercially available.

Fluoropolymer materials useful in the present invention include those fluoropolymers broadly categorized structurally into two basic classes. A first class includes those fluorinated polymers, copolymers, terpolymers, etc., comprising interpolymerized units derived from vinylidene fluoride (sometimes referred to as "$VF_2$," or "VDF"). Preferably, fluoropolymer materials of this first class comprise at least 3% by weight of interpolymerized units derived from $VF_2$. Such polymers may be homopolymers of $VF_2$ or copolymers of $VF_2$ and other ethylenically unsaturated monomers.

$VF_2$-containing polymers and copolymers can be made by well-known conventional means, for example by free-radical polymerization of $VF_2$ with or without other ethylenically-unsaturated monomers. The preparation of colloidal aqueous dispersions of such polymers and copolymers is described, for example, in U.S. Pat. No. 4,335,238. It follows the customary process for copolymerizing fluorinated olefins in colloidal aqueous dispersions, which is carried out in the presence of water-soluble initiators that produce free radicals, such as, for example, ammonium or alkali metal persulfates or alkali metal permanganates, and in the presence of emulsifiers, such as, in particular, the ammonium or alkali metal salts of perfluorooctanoic acid.

Useful fluorine-containing monomers include hexafluoropropylene ("HFP"), tetrafluoroethylene ("TFE"), chlorotrifluoroethylene ("CTFE"), 2-chloropentafluoro-propene, perfluoroalkyl vinyl ethers, e.g. $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Squire). Certain fluorine-containing di-olefins also are useful, such as perfluorodiallylether and perfluoro-1,3-butadiene. The fluorine-containing monomer or monomers also may be copolymerized with fluorine-free terminally unsaturated olefinic commonomers, e.g., ethylene or propylene. Preferably at least 50% by weight of all monomers in a polymerizable mixture are fluorine-containing. The fluorine-containing monomer may also be copolymerized with iodine-or bromine-containing cure-site monomers in order to prepare peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-butene-1.

Commercially available fluoropolymer materials of this first class include, for example, Kynar™ 740 fluoropolymer (available from Elf Atochem North America, Inc.), and Fluorel™ FC-2178 fluoropolymer (available from Dyneon LLC, St. Paul, Minn.).

A second class of fluorinated material useful in the practice of the invention broadly comprises those fluorinated polymers, copolymers, terpolymers, etc., comprising interpolymerized units derived from one or more of hexafluoropropylene ("HFP") monomers, tetrafluoroethylene ("TFE") monomers, chlorotrifluoroethylene monomers, and/or other perhalogenated monomers and possibly additionally including one or more hydrogen-containing and/or non-fluorinated olefinically unsaturated monomers. Useful olefinically unsaturated monomers include alkylene monomers such as ethylene, propylene, 1-hydropentafluoropropene, 2-hydropentafluoropropene, etc.

Fluoropolymers of this second class can be prepared by methods known in the fluoropolymer art. Such methods include, for example, free-radical polymerization of hexafluoropropylene and/or tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See, for example, U.S. Pat. No. 4,335,238.

Representative of the fluoropolymer materials of the second class are poly(ethylene-co-tetrafluoroethylene) (ETFE), poly(tetrafluoroethylene-co-propylene), poly(chlorotrifluoroethylene-co-ethylene) (ECTFE), and the terpolymer poly(ethylene-co-tetrafluoroethylene-co-hexafluoropropylene), among others; all of which may be prepared by the above-described known polymerization methods. Useful fluoropolymer materials are available commercially, for example from Dyneon LLC under the designations Hostaflon™ X6810, and X6820; from Daikin America, Inc., under the designations Neoflon™ EP-541, EP-521, and EP-610; from Asahi Glass Co. under the trade designations Aflon™ COP C55A, C55AX, C88A; and from DuPont under the trade designations Tefzel™ 230 and 290.

Examples of polycarbonates and polyimides suitable for use in the invention include: bisphenyl-A polycarbonates; and polyimides selected from the group consisting of poly (4,4'-oxydiphenylenepyromellitimide) poly (4,4'-iminodiphenylenepyromellitimide), poly (4,4'-diphenylenepyromellitimide), poly (4,4'-di (3,3'-dimethyl) diphenylenepyromellitimide), poly (4,4-oxydiphenylene-4, 4',3,3'-biphenyldiimide), and copolymers thereof.

Commercially available polycarbonates are sold under the brand names of Lexan from General Electric Corporation, and Makrolon from Farbenbabriken Bayer AG.

Commercially available polyimides have structures I and II, described below and are sold under the brand names of Kapton, and Upilex respectively. Structure I is poly (4,4'-oxydiphenylenepyromellitimide), which is the reaction product of pyromellitic dianhydride and 4,4'-diaminodiphenylether and is available as Kapton from DuPont, Wilmington, Del., and as Apical from Allied-Signal Corp., Morristown, N.J. It is also made by Kanegafuchi Chemical Industries Co., Ltd., Japan.

Structure II is the reaction product of 3,3',4,4'-biphenyltetracarboxylic acid dianhydride and 4,4'-diaminodiphenylether available as Upilex from Ube Chemical Industries, Japan.

Other ordered polyimides include the reaction product of pyromellitic dianhydride and para-phenylene diamine available as Apical NPI from Allied-Signal Corp. and the reaction product of pryomellitic dianhydride and a combination of 4,4'-diaminodiphenylether and 3,3'-dimethylbenzidine, available from Mitsubishi Chemical Industries, Japan.

In the process of the invention, at least one polymeric surface of an article, said surface comprising a polymeric material, is exposed to a corona discharge in an atmosphere containing nitrogen and from about 0.01 to about 10 volume percent hydrogen gas ammonia or a mixture of hydrogen gas and ammonia. The corona treatment may be performed in any corona treatment system capable of controlling atmospheric gas conditions. Corona treaters adaptable for use in the present invention are commercially available, for example from Sherman Treaters, Ltd. (Thame, UK), Enercon Indus. Corp. (Menomonee Falls, Wis.), and Pillar Technologies (Hartland, Wis.). An example of a corona system suitable for use in the invention is provided in the Examples below.

The atmosphere in which the corona treatment is performed contains nitrogen and about 0.01 to about 10 volume percent hydrogen gas, ammonia or a mixture thereof. While it is believed that atmospheres containing nitrogen and more than about 10 percent hydrogen or ammonia will produce advantageous surface modification when used in the corona process described herein, such atmospheres are toxic or highly explosive when mixed with air or oxygen and are less practical, particularly in the industrial setting.

In general, the atmosphere in which the corona treatment process of this invention is performed contains a major proportion of nitrogen, i.e., greater than 50 volume percent, more preferably greater than 75 volume percent, and most preferably greater than 90 volume percent nitrogen gas. Such atmospheres produce a characteristic, atmospheric pressure "corona" discharge, characterized as a sustained violet or blue filamentary corona. In one exemplary embodiment of the invention, the atmosphere in which the corona treatment is performed contains about 90 to 99.99 volume percent nitrogen gas and about 0.01 to 10 volume percent hydrogen gas, ammonia, or a mixture of hydrogen gas and ammonia. Atmospheres containing lesser, but still significant, amounts of nitrogen could produce a corona discharge in accordance with the invention, but would likely require the addition of other reactive or inert gases that would increase cost and decrease efficiency of the process.

Additional additive or trace gases or ingredients may be present, but preferably not in amounts that interfere with the corona discharge or that result in undesirable properties in the polymer surface being treated. The inventive process can be operated in the absence of any substantial proportion of argon, ie. less than 1 volume percent. Another subset of the inventive process involves operating in the absence of substantial water vapor in the gas surrounding the corona, ie. less than 0.1% by volume water vapor.

The corona treatment utilized in the present invention may be characterized in terms of a "normalized energy" which is calculated from the net power and the velocity of the polymer film being treated in the corona treatment system, according to the following formula:

normalized energy=P/wv where P is the net power (in Watts), w is the corona treatment electrode width (in cm), and v is the film velocity (in cm/s). Typical units for normalized energy are Joules/square centimeter. In preferred embodiments of the present invention, the corona discharge is characterized by having a normalized energy of between about 0.1 and about 100, and more preferably between about 1 and about 20, Joules per square centimeter.

Following the corona treatment, the process of the invention may further include the step of coating the corona treated polymer surface with an adhesive. The particular adhesive used will depend on the intended application for the adhesive coated material, and on its compatibility with the polymer film used in the corona process. Examples of adhesives useful in the present invention include pressure sensitive adhesives such as tackified natural rubbers, synthetic rubbers, tackified styrene block copolymers, polyvinyl ethers, acrylics, poly- -olefins, and silicones. Methods of coating such adhesives to corona-treated surfaces are well known in the art.

EXAMPLES

This invention may be illustrated by way of the following examples.

Test Methods

The following test methods were used to evaluate and characterize film surfaces produced in the examples.
Advancing and Receding Contact Angles Measurements of the advancing and receding contact angles in air of deionized, filtered water on treated surfaces were made using the Wilhelmy plate method on a Cahn DCA-322 dynamic contact-angle instrument. The surface tension of the water was measured as 72.6 mN/m at 21° C. using a microbalance. A three-layer laminate was prepared using Scotch Brand #666 double-coated tape to mount the treated sides of the film outward. To prevent contamination during the preparation of this laminate, the treated surfaces only contacted identical untreated film. This arrangement is analogous to the practice of winding modified film into roll form after treatment. The laminate was cut into a 2.54×2.54 cm square for analysis. The stage speed was 49.8 $\mu$m/s with a travel distance of ca. 1 cm. The advancing and receding contact angles were calculated using a software routine supplied with the Cahn instrument that uses linear-regression analysis for the buoyancy correction.
Surface Composition Determination Surface chemistry of treated samples was analyzed using X-ray photoelectron spectroscopy (XPS or ESCA). ESCA spectra were obtained on a Hewlett-Packard Model 5950B spectrometer using a monochromatic AlK photon source at an electron take-off angle with respect to the surface of 38°. Spectra were referenced with respect to the 285.0 eV carbon 1s level observed for hydrocarbon.

Examples 1–3 and Comparative Examples 1 and 2

In Example 1, a 30 cm wide, 0.05 mm thick film made from thermally extruded, calendared, and sintered, Teflon™ polytetrafluoroethylene (PTFE) resin (available from E. I. du Pont de Nemours and Company) was corona treated while immersed in a controlled gaseous environment. The substrate was placed in contact with a 40 cm diameter nickel-plated aluminum ground-roll while it passed under a powered electrode that consisted of fifteen individual ceramic-covered electrodes (available from Sherman Treaters Ltd., Thame, United Kingdom) each with a 15 mm square cross-section and an active length of 35 cm. The electrodes were connected to a model RS48-B variable-frequency power supply (available from ENI Power Systems Inc. Rochester, N.Y.). The net power dissipated in the corona was measured with a directional power meter incorporated into the ENI supply. The frequency of the output power was manually adjusted to about 16 kHz to obtain optimal impedance matching (minimum reflected power). The gap between the electrodes and the ground roll was about 69 mils (1.75 mm).

The normalized energy of the corona treatment (in J/cm$^2$) was calculated from the net power and the film velocity:

normalized energy=P/wv where P was the net power (in W), w was the electrode width (in cm), and v was the film velocity (in cm/s). Corona treatment was run at 17 J/cm², which can be achieved by using a power of 2500 W and a web speed of 4.2 cm/sec.

The corona-treatment system was enclosed and equipped with gas handling and mixing capabilities designed to control the composition of the atmosphere in which the corona discharge is formed. After an initial high-flow purge of nitrogen, the treater enclosure was continually flushed with 100 liters/min of process gas introduced near the electrodes. The composition of the process gas was 0.01 volume percent hydrogen in nitrogen. The ground-roll temperature was controlled to 100° C. during the treatment by a STERLCO™ water recirculation system.

In Examples 2 and 3, PTFE films were corona treated in a manner similar to that of Example 1 except that the gas introduced near the electrodes contained different amounts of hydrogen: 0.1 volume percent and 1 volume percent, respectively, as listed in Table 1. In Comparative Example 1, PTFE film was not corona treated. In Comparative Example 2, PTFE film was treated as in Example 1 except that the corona atmosphere contained only nitrogen.

Examples were tested for advancing and receding angle, and F/C, O/C and N/C ratios. The results are reported in Table 1.

TABLE 1

| Example | Hydrogen (Percent) | Advancing Angle (Degrees) | Receding Angle (Degrees) | ESCA F/C Ratio | ESCA O/C Ratio | ESCA N/C Ratio |
|---|---|---|---|---|---|---|
| C1 | 0 | 126 | 89 | 2.00 | 0 | 0 |
| C2 | 0 | 100 | 41 | 1.59 | 0.06 | 0.05 |
| 1 | 0.01 | 100 | 14 | — | — | — |
| 2 | 0.1 | 82 | 10 | 0.93 | 0.17 | 0.34 |
| 3 | 1 | 74 | 12 | 0.89 | 0.15 | 0.23 |

The effect of hydrogen additions to a nitrogen-atmosphere corona for the treatment of PTFE are evident from contact-angle analysis and surface-composition analysis. As shown in Table 1, the advancing and receding contact angles of untreated PTFE are 126 degrees and 89 degrees, respectively. The advancing and receding contact angles of PTFE modified in a pure nitrogen atmosphere, 100 degrees and 41 degrees respectively, demonstrate the minor amount of surface modification achieved by corona treatment in a pure nitrogen atmosphere. Examples 1–3 demonstrate that the contact angles of the corona-treated surfaces are consistently and significantly reduced by additions of hydrogen to the nitrogen corona atmosphere.

The trends in contact-angle analysis of Examples 1–3 and Comparative Examples 1–2 are reflected in the ESCA surface-composition analysis. The fluorine-atom concentration on the treated surface, measured by the F/C ratio, shows that the untreated film has a ratio of 2.00, the film treated in a pure-nitrogen atmosphere has a F/C ratio of 1.59, and the films treated with nitrogen/hydrogen atmospheres have F/C ratios of less than 1.00.

The trend in the F/C ratio is reflected in the oxygen and nitrogen content of the treated surfaces. The surface oxygen-atom concentration and the surface nitrogen-atom concentration are measured by the O/C ratio and the N/C ratio, respectively. No measurable amount of oxygen or nitrogen atoms are detected on the surface of the untreated film, Comparative Example C1. Small amounts of oxygen and nitrogen, O/C of 0.06 and N/C of 0.05, are detected on PTFE film treated in a pure-nitrogen-atmosphere corona. The addition of hydrogen to the nitrogen-atmosphere corona significantly increases the concentration of both oxygen and nitrogen on the treated surface. In Example 2, PTFE treated in a 0.1% hydrogen in nitrogen atmosphere has O/C of 0.17 and N/C of 0.34. In Example 3, PTFE treated in a 1% hydrogen in nitrogen atmosphere has O/C of 0.15 and N/C of 0.23.

The FIGURE shows carbon 1s (C1s) ESCA spectra for Comparative Example 2, Example 2, and Example 3. The peak evident at 292 eV indicates carbon bound as $CF_2$. The peak evident at 285 eV indicates $CH_n$ or carbon-carbon bonding. Binding energy levels between 292 and 285 eV indicate partially fluorinated carbon atoms or carbon atoms bound to oxygen or nitrogen atoms. ESCA of the untreated PTFE substrate shows only a single C1s peak centered at 292.0 eV. As the concentration of a hydrogen addition to a nitrogen corona atmosphere increase, the ESCA spectra indicate a shift to lower binding energies, indicating defluorination of the surface carbon atoms.

Examples 1–3 and Comparative Examples 1–2 demonstrate that slight surface modification is created by pure-nitrogen corona treatment of PTFE, but hydrogen additions to a nitrogen-atmosphere corona treatment of PTFE significantly increase the degree of surface modification.

Examples 4 and 5

In Examples 4 and 5, PTFE film was corona treated in a manner similar to that used in Example 1 except the gas composition, and the ground-roll temperature were different. The gas introduced near the electrodes was nitrogen that contained 0.1 volume percent of ammonia for Example 4 and 1 volume percent ammonia for Example 5. Corona treatment was run at 17 J/cm², which can be achieved in the described system by using a power of 2000 W and a web speed of 3.3 cm/sec. The ground-roll temperature during corona treatment of the film was 10° C.

All examples were tested for advancing and receding angle, and F/C, O/C and N/C ratios. The results are reported in Table 3 together with those of Comparative Examples 1 and 2.

TABLE 3

| Example | Ammonia (Percent) | Advancing Angle (Degrees) | Receding Angle (Degrees) | ESCA F/C Ratio | ESCA O/C Ratio | ESCA N/C Ratio |
|---|---|---|---|---|---|---|
| C1 | 0 | 126 | 89 | 2.00 | 0 | 0 |
| C2 | 0 | 100 | 41 | 1.59 | 0.06 | 0.05 |
| 4 | 0.1 | 92 | 16 | 1.17 | 0.10 | 0.11 |
| 5 | 1 | 69 | 10 | 0.71 | 0.12 | 0.14 |

The effect of ammonia additions to a nitrogen-atmosphere corona for the treatment of PTFE are evident from contact-angle analysis and surface-composition analysis. As seen in Table 3, the advancing and receding contact angles of untreated PTFE (Comparative Example 1) are 126 degrees and 89 degrees, respectively. The advancing and receding contact angles of PTFE modified in a pure-nitrogen atmosphere (Comparative Example 2), 100 degrees and 41 degrees respectively, demonstrate the minor amount of surface modification achieved by corona treatment in a pure-nitrogen atmosphere. Examples 4 and 5 demonstrate that the contact angles of the corona-treated surfaces are consistently and significantly reduced by additions of ammonia to the nitrogen-corona atmosphere.

The trends in contact-angle analysis of Examples 4–5 and Comparative Examples 1–2 are reflected in the ESCA surface-composition analysis. The fluorine-atom concentration on the treated surface, measured by the F/C ratio, shows that the untreated film has a ratio of 2.00, the film treated in a pure-nitrogen atmosphere has a F/C ratio of 1.59, and the films treated with nitrogen/ammonia atmospheres have F/C ratios of less than 1.20.

The trend in the F/C ratio is reflected in the oxygen and nitrogen content of the treated surfaces. The surface oxygen-atom concentration and the surface nitrogen-atom concentration are measured by the O/C ratio and the N/C ratio, respectively. No measurable amount of oxygen or nitrogen atoms are detected on the surface of the untreated film, Comparative Example C1. Small amounts of oxygen and nitrogen, O/C of 0.06 and N/C of 0.05, are detected on PTFE film treated in a pure-nitrogen-atmosphere corona. The addition of ammonia to the nitrogen-atmosphere corona significantly increases the concentration of both oxygen and nitrogen on the treated surface. In Example 4, PTFE treated in a 0.1% ammonia in nitrogen atmosphere has O/C of 0.10 and N/C of 0.11. In Example 5, PTFE treated in a 1% ammonia in nitrogen atmosphere has O/C of 0.12 and N/C of 0.14.

Examples 4–5 and Comparative Examples 1–2 demonstrate that slight surface modification is created by pure-nitrogen corona treatment of PTFE, but ammonia additions to a nitrogen-atmosphere corona treatment of PTFE significantly increase the degree of surface modification.

Examples 6 and 7, and Comparative Examples 3 and 4

In Examples 6 and 7, a film was corona treated in a manner similar to that used in Example 1 except the film, the gas composition, the normalized energy, and the ground-roll temperature were different. Corona treatment was run at 1.7 J/cm², which can be achieved in the described system by using a power of 2000 W and a web speed of 33 cm/sec. The film was Makrolon™ type 2407 polycarbonate (available from Bayer Polymers Division, Pittsburgh, Pa.) film, having a width of 15 cm and a thickness of 0.10 mm. The gas introduced near the electrodes was comprised of nitrogen with 0.1 volume percent hydrogen for Example 6 and nitrogen with 1 volume percent hydrogen for Example 7. The ground-roll temperature during corona treatment of the film was 25° C. In Comparative Example 3, polycarbonate film was not corona treated. In Comparative Example 4, polycarbonate film was treated as in Example 6 except that the corona atmosphere contained only nitrogen.

All examples were tested for advancing and receding angle, and O/C and N/C ratios. The results are reported in Table 4.

TABLE 4

| Example | Hydrogen (Percent) | Advancing Angle (Degrees) | Receding Angle (Degrees) | ESCA O/C Ratio | ESCA N/C Ratio |
|---|---|---|---|---|---|
| C3 | 0 | 96 | 75 | 0.19 | 0.00 |
| C4 | 0 | 101 | 76 | 0.19 | 0.00 |
| 6 | 0.1 | 84 | 25 | 0.21 | 0.02 |
| 7 | 1 | 73 | 12 | 0.25 | 0.06 |

The effects of hydrogen additions to a nitrogen-atmosphere corona for the treatment of polycarbonate are evident from contact angle analysis and surface composition analysis. As seen in Table 4, the advancing and receding contact angles of untreated polycarbonate (Comparative Example 3) are 96 degrees and 75 degrees, respectively. The advancing and receding contact angles of polycarbonate modified in a pure nitrogen atmosphere (Comparative Example 4), 101 degrees and 76 degrees respectively, demonstrate that no surface modification is achieved by corona treatment in a pure nitrogen atmosphere. Analysis of Examples 6 and 7 demonstrates that the contact angles of the corona-treated surfaces are consistently and significantly reduced by additions of hydrogen to the nitrogen corona atmosphere.

The trends in contact-angle analysis of Examples 6–7 and Comparative Examples 3–4 are reflected in the ESCA surface-composition analysis. The oxygen-atom concentration on the treated surface, measured by the O/C ratio, show that the untreated film has a ratio of 0.19, the film treated in a pure-nitrogen atmosphere has an unchanged O/C ratio of 0.19, and the films treated with nitrogen/hydrogen atmospheres have O/C ratios of 0.21 and 0.25.

The trend in the O/C ratio is reflected in the nitrogen content of the treated surfaces. The surface nitrogen-atom concentration is measured by the N/C ratio. No measurable amount of nitrogen atoms is detected on the surface of the untreated film or on the film treated in a pure-nitrogen corona, Comparative Examples 3–4. In Example 6, polycarbonate treated in a 0.1% hydrogen in nitrogen atmosphere has N/C of 0.02. In Example 7, polycarbonate treated in a 1% hydrogen in nitrogen atmosphere has N/C of 0.06.

Examples 6–7 and Comparative Examples 3–4 demonstrate that no significant surface modification is created by pure-nitrogen corona treatment of polycarbonate, but hydrogen additions to a nitrogen-atmosphere corona treatment of polycarbonate produce measurable surface modification.

Examples 8 and 9, and Comparative Examples 5 and 6

In Examples 8 and 9, a polyimide film was corona treated in a manner similar to that used in Example 1 except the film, the gas composition, the normalized energy, and the ground-roll temperature were different. Corona treatment was run at 1.7 J/cm², which can be achieved in the described system by using a power of 2000 W and a web speed of 33 cm/sec. The film was Kapton™ type E polyimide (available from E. I. du Pont de Nemours and Company) film, having a width of 15 cm and a thickness of 0.06 mm. The gas introduced near the electrodes was nitrogen with 0.1 volume percent of hydrogen for Example 8 and nitrogen with 1 volume percent of hydrogen for Example 9. The ground-roll temperature during corona treatment of the film was 25° C. In Comparative Example 5, polyimide film was not corona treated. In Comparative Example 6, polyimide film was treated as in Example 8 except that the corona atmosphere contained only nitrogen.

All examples were tested for advancing and receding angle, and O/C and N/C ratios. The results are reported in Table 5.

TABLE 5

| Example | Hydrogen (Percent) | Advancing Angle (Degrees) | Receding Angle (Degrees) | ESCA O/C Ratio | ESCA N/C Ratio |
|---|---|---|---|---|---|
| C5 | 0 | 73 | 23 | 0.19 | 0.04 |
| C6 | 0 | 75 | 15 | 0.18 | 0.05 |
| 8 | 0.1 | 49 | 0 | 0.23 | 0.10 |
| 9 | 1 | 47 | 2 | 0.23 | 0.11 |

The effects of hydrogen additions to a nitrogen-atmosphere corona for the treatment of polyimide are evident from contact angle analysis and surface composition analysis. As shown in Table 5, the advancing and receding contact angles of untreated polyimide (Comparative Example 5) are 73 degrees and 23 degrees, respectively. The advancing and receding contact angles of polyimide modified in a pure nitrogen atmosphere (Comparative Example 6), 75 degrees and 15 degrees respectively, demonstrate that minimal modification is achieved by corona treatment in a pure nitrogen atmosphere. Examples 8 and 9 demonstrate that the contact angles of the corona-treated surfaces are consistently and significantly reduced by additions of hydrogen to the nitrogen corona atmosphere.

The trends in contact-angle analysis of Examples 8–9 and Comparative Examples 5–6 are reflected in the ESCA surface-composition analysis. The oxygen-atom concentration on the treated surface, measured by the O/C ratio, shows that the untreated film has a ratio of 0.19, the film treated in a pure-nitrogen atmosphere has a similar O/C ratio of 0.18, and the films treated with nitrogen/hydrogen atmospheres have O/C ratios of 0.23.

The trend in the O/C ratio is reflected in the nitrogen content of the treated surfaces. The nitrogen-atom concentration on the treated surface, measured by the N/C ratio, show that the untreated film has a ratio of 0.04, the film treated in a pure-nitrogen atmosphere has a similar N/C ratio of 0.05, and the films treated with nitrogen/hydrogen atmospheres have O/C ratios of 0.10 and 0.11.

Examples 8–9 and Comparative Examples 5–6 demonstrate that no significant surface modification is created by pure-nitrogen corona treatment of polyimide, but hydrogen additions to a nitrogen-atmosphere corona treatment of polyimide produce a measurable level of surface modification.

Other embodiments of the invention are within the scope of the following claims.

What is claimed is:

1. A process for treating a polymeric surface of an article comprising exposing at least one polymeric surface comprising a polymeric material selected from the group consisting of fluoropolymers, polycarbonates, and polyimides to a corona discharge at substantially atmospheric pressure in an atmosphere comprising a major proportion of nitrogen gas and about 0.01 to about 10 volume percent hydrogen.

2. The process of claim 1 in which the corona discharge takes place in an atmosphere comprising greater than 50 volume percent nitrogen.

3. The process of claim 2 wherein said polymeric surface is in the form of a polymer film.

4. The process of claim 3 wherein said polymer film is a fluoropolymer film.

5. The process of claim 4, wherein said fluoropolymer film comprises polytetrafluoroethylene.

6. The process of claim 3 wherein said polymer film comprises a polycarbonate film.

7. The process of claim 3 wherein said polymer film comprises a polyimide film.

8. The process of claim 1, wherein said corona discharge is characterized by a normalized energy of between about 0.1 and about 100 joules per square centimeter of polymeric surface.

9. The process of claim 8, wherein said corona discharge is characterized by a normalized energy of between about 1 and about 20 joules per square centimeter of polymeric surface.

10. The process of claim 1 which further comprises coating the corona treated surface with a pressure sensitive adhesive.

11. The process of claim 1 wherein said corona discharge has an absence of any substantial proportion of argon.

12. The process of claim 1 in which the corona discharge atmosphere is characterized by a substantial absence of water.

13. A process for treating a polymeric surface of an article comprising exposing at least one polymeric surface comprising a polymeric material selected from the group consisting of fluoropolymers, polycarbonates, and polyimides to a corona discharge at a pressure of about atmospheric pressure in an atmosphere consisting of a major proportion of nitrogen gas, about 0.01 to about 10 volume percent of an additional gas selected from the group consisting of hydrogen, ammonia, and mixtures thereof, and optionally other inert gas.

14. The process of claim 13, wherein said atmosphere consists of nitrogen, about 0.1 to 1.0 volume percent of an additional gas selected from the group consisting of hydrogen, ammonia, and mixtures thereof, and optionally other inert gases.

15. A process for treating a polymeric surface of an article comprising exposing at least one polymeric surface comprising a polymeric material selected from the group consisting of polycarbonates and polyimides to a corona discharge at substantially atmospheric pressure in an atmosphere comprising a major proportion of nitrogen gas and about 0.01 to about 10 volume percent of an additional gas selected from the group consisting of hydrogen, and a mixture hydrogen and ammonia.

* * * * *

UNITED STATES PATENT AND TRADEMARK OFFICE
CERTIFICATE OF CORRECTION

PATENT NO.: 5,972,176
DATED: October 26, 1999
INVENTOR(S): Kirk et al.

It is certified that error appears in the above-identified patent and that said Letters Patent is hereby corrected as shown below:

Column 6, line 4, "poly- -olefins" should read --poly-$\alpha$-olefins--.

Column 6, line 38, "A1K" should read --A1K$_\alpha$--.

Column 12, line 33, "gas" should read --gases--.

Column 12, line 47, "mixture" should read --mixture of--.

Signed and Sealed this

Seventeenth Day of April, 2001

Attest:

NICHOLAS P. GODICI

Attesting Officer     Acting Director of the United States Patent and Trademark Office